[11] 3,583,483

[72] Inventor Robert W. Foote
Huntington Beach, Calif.
[21] Appl. No. 840,217
[22] Filed July 9, 1969
[45] Patented June 8, 1971
[73] Assignee Chevron Research Company
San Francisco, Calif.

[54] METHOD FOR USING FOAM IN WELLS
4 Claims, 3 Drawing Figs.
[52] U.S. Cl. .................................................. 166/250,
166/312
[51] Int. Cl. ...................................................... E21b 21/00,
E21b 47/06
[50] Field of Search ............................................. 175/69, 71,
65; 166/310, 311, 312, 250, 309

[56] References Cited
UNITED STATES PATENTS

| | | | |
|---|---|---|---|
| 3,130,798 | 4/1964 | Schramm et al. .............. | 175/69 |
| 3,391,750 | 7/1968 | Zika .......................... | 175/69X |
| 3,493,059 | 2/1970 | Cox ........................... | 175/69 |

FOREIGN PATENTS

| | | | |
|---|---|---|---|
| 378,318 | 8/1932 | Great Britain................ | 175/69 |

*Primary Examiner*—Stephen J. Novosad
*Attorneys*—A.L. Snow, F. E. Johnston, R. L. Freeland, Jr. and E. J Keeling ABSTRACT: A method of providing an improved foam having high lifting capability for use in wells by controlling the liquid volume/gas volume ratio of the foam to a value between 0.02 and 0.2.

3,583,483

METHOD FOR USING FOAM IN WELLS

CROSS REFERENCE TO RELATED APPLICATIONS

The present invention is related to the field of inventions disclosed and claimed in copending U.S. applications Ser. No 704,832, filed Feb. 12, 1968, now U.S. Pat. No. 3,463,231; Ser. No 720,977, filed Apr. 12, 1968, now U.S. Pat. No. 3,486,560, and Ser. No. 807,766, filed Mar. 13, 1969.

BACKGROUND OF THE INVENTION

This invention relates to a method of providing a foam having high lifting capability for use in a well and, more particularly, this invention provides for controlling the liquid volume/gas volume ratio of foam to a value between .02 and 0.2 so as to provide a foam for use in wells having superior lifting capability.

Various gas/liquid foams have heretofore been used in oil fields for various techniques of drilling, well cleaning and circulating material into and out of wells. As noted in the above related applications, foam is formed by mixing a suitable gas with a foamable solution under conditions which cause the solution to foam. The foam forms a circulating fluid which is injected down a well and circulated up the well annulus to remove sand, well cuttings and other material from the well. It has been found that by carefully controlling the liquid and gas mixture that an improved foam having a maximum lifting capability can be made.

SUMMARY OF THE INVENTION

The present invention is directed to a method of moving material in a well utilizing a foam injected down the well and circulated up the well. The method includes the steps of generating a gas/liquid foam, injecting the foam down a well and using the foam to move material in the well while controlling the ratio of the liquid volume of the foam to the gas volume of the foam to a value between 0.02 and 0.2. Careful control of the liquid volume/gas volume ratio causes the resultant foam to have high lifting capability which is especially desirable when removing cuttings, chips, sand or the like from a well.

BRIEF DESCRIPTION OF THE INVENTION

A liquid/gas foam is formed by contacting a suitable liquid, such as an aqueous sufactant solution, with a suitable gas, such as air. The liquid and gas are contact in a manner so that a foam will result. A foam generator, such as a wire mesh, may be used in a common liquid/gas conduit. The foam is injected down a well and circulated up the well to the surface to carry drilling chips, sand and the like from the well. In order to maximize the lifting capability of the foam in the well, the pressure at which the foam is being used is determined and based on this determination the liquid and gas ratios of the foam being formed are controlled in a manner to insure that the liquid volume/gas volume ratio of the foam is maintained at a value which forms a foam of superior lifting capability. By maintaining the liquid volume/gas volume ratio of the foam at a value between 0.02 and 0.2, the resulting foam has far greater lifting capability than water.

OBJECTS OF THE INVENTION

A particular object of the present invention is to provide a foam having superior lifting capability for use in a well. Further objects and advantages of the present invention will become apparent from the following detailed description read in light of the accompanying drawings which are made a part of this specification.

DESCRIPTION OF THE PREFERRED EMBODIMENT

Figure 1:
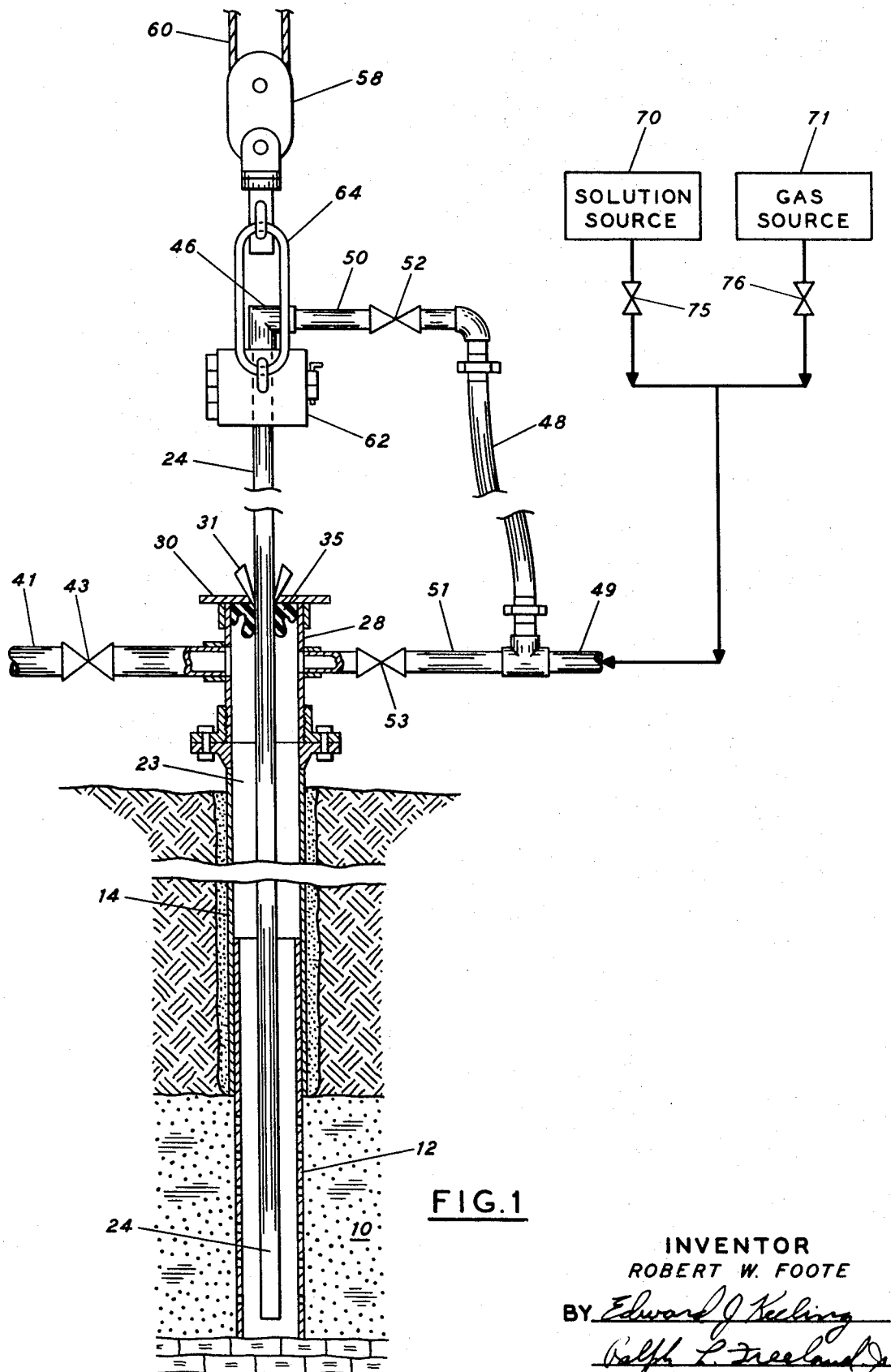
FIG. 1 is a view of the preferred embodiment of apparatus assembled in accordance with the invention and illustrates apparatus for using foam in a well.

Refer now to the drawings and to FIG. 1 in particular where the preferred embodiment of apparatus assembled in accordance with the present invention is illustrated. FIG. 1 shows an elevation view, partially in section, of a well which penetrates the earth to an oil-bearing formation 10. This is the general environment where the method of the present invention finds utility. The portion of the well adjacent the producing formation 10 contains a perforated or otherwise suitably slotted well liner 12. The well liner 12 is connected by suitable means to a string of casing 14 which extends from the upper portion of the producing formation through the earth to the surface. The well liner is placed during completion of the well, and oil from the producing formation enters the well through the slots in the well liner 12. Sand also enters the well through the slots and collects in the well and can eventually hinder production therefrom. In accordance with the present invention, foam having a high lifting capacity is circulated to remove such sand from the well. The present invention is also useful, of course, when initially drilling the well to remove cuttings and the like from the well and also to circulate material in the well.

In accordance with the preferred form of the invention, a tubing string 24 is positioned in the well through a suitable wellhead 28. The particular size and type of tubing string will depend upon the particular well being serviced. Both segmented and continuous tubing strings are useful in the present invention. When using a segmented tubing string, slips 31 are positioned on a slip base plate 30 which is connected to the top of the wellhead 28. The slips 31 are used to hold the tubing string during make up of the string. Stripper rubber 35 is used in the wellhead 28 to prevent leakage of foam past the tubing string where it enters the wellhead. The lower head of the tubing string 24 is positioned in the well adjacent where the sand or other material to be removed is located. The tubing string and the well liner 12-well casing 14 form a well annulus 23. Thus a path for circulating foam through the well is provided in the interior of tubing string 24 and well annulus 23. A blooie line 41 is connected through valve 43 to the well annulus 23 for exhausting foam from the annulus 23. Valve 43 also controls the back pressure placed in foam being circulated up the annulus. The tubing string may be raised or lowered in the well during foam circulation by hoist means which include a traveling block 58 which is moved by suitable cable 60. A conventional hoist means or derrick, not shown, is used to move the traveling block up and down. The elbow joint 46 which is connected to the upper end of the tubing string 24 is held in an elevator 62 which is connected by suitable links 64 to move the traveling block 58. Thus when the traveling block 58 moves up or down the tubing string, the apparatus connected thereto is also raised or lowered.

Foam is formed by mixing together a foamable solution and a gas. The foam must have good lifting capability in order to efficiently remove chips, sand and gravel from the wall. Suitable surface apparatus for forming a foam includes a foamable solution source 70 and a gas source 71. The gas and liquid sources are located on the surface and suitable piping extends from these sources to a common conduit 49. A valve 75 on the solution source 70 controls the amount of aqueous foamable solution which is used to make the foam. Similarly, valve 76 controls flow of gas from gas source 71 to conduit 49. When the gas and foamable solution come together in the common mixing line a foam is formed. Conduit 49 is connected to the tubing string 24 through flexible conduit 48, conduit 50 and elbow joint 46. Valve 52 is used to control foam flow to the tubing string. A conduit 49 is connected to the well annulus by means of conduit 51 via wellhead 28. Valve 53 controls foam flow to the well annulus. Thus foam may be circulated in a normal manner, i.e., down the tubing and up the annulus, or foam circulation may be reversed, i.e., down the annulus and up the tubing.

The foam is formed by bringing together a foamable solution and gas. The preferred liquid foamable solution is an aqueous surfactant solution. Numerous gases are available for use with such a liquid surfactant solution to form a foam. Such gases include air, nitrogen, natural gas and carbon dioxide. Because of its availability and low cost, air is usually the preferred gas. However, nitrogen and natural gas, when available, have an advantage over air in that danger of fire in an oil well is reduced. However, all things considered, the preferred foam is an aqueous-air foam. Water and a detergent and if desired suitable stabilizing agents are mixed to produce a foamable solution. Suitable foams and specific surfactants which go into foamable solutions that make them are described in detail in application Ser. No 704,832, filed Feb. 12, 1968, and now U.S. Pat. No. 3,463,231. The disclosure of such application is incorporated herein by reference. A preferred surfactant for use in the present invention is a $C_{11}$-–$C_{14}$ alkylbenzene sulfonate (ABS) preferably the ammonium salt. The surfactant should be added to water to form a foamable solution in an amount between 0.5 to 1.0 parts by weight per 100 parts by water. A foamable solution is mixed with air in a liquid gas volume/relationship as set out in detail below.

Figure 2:
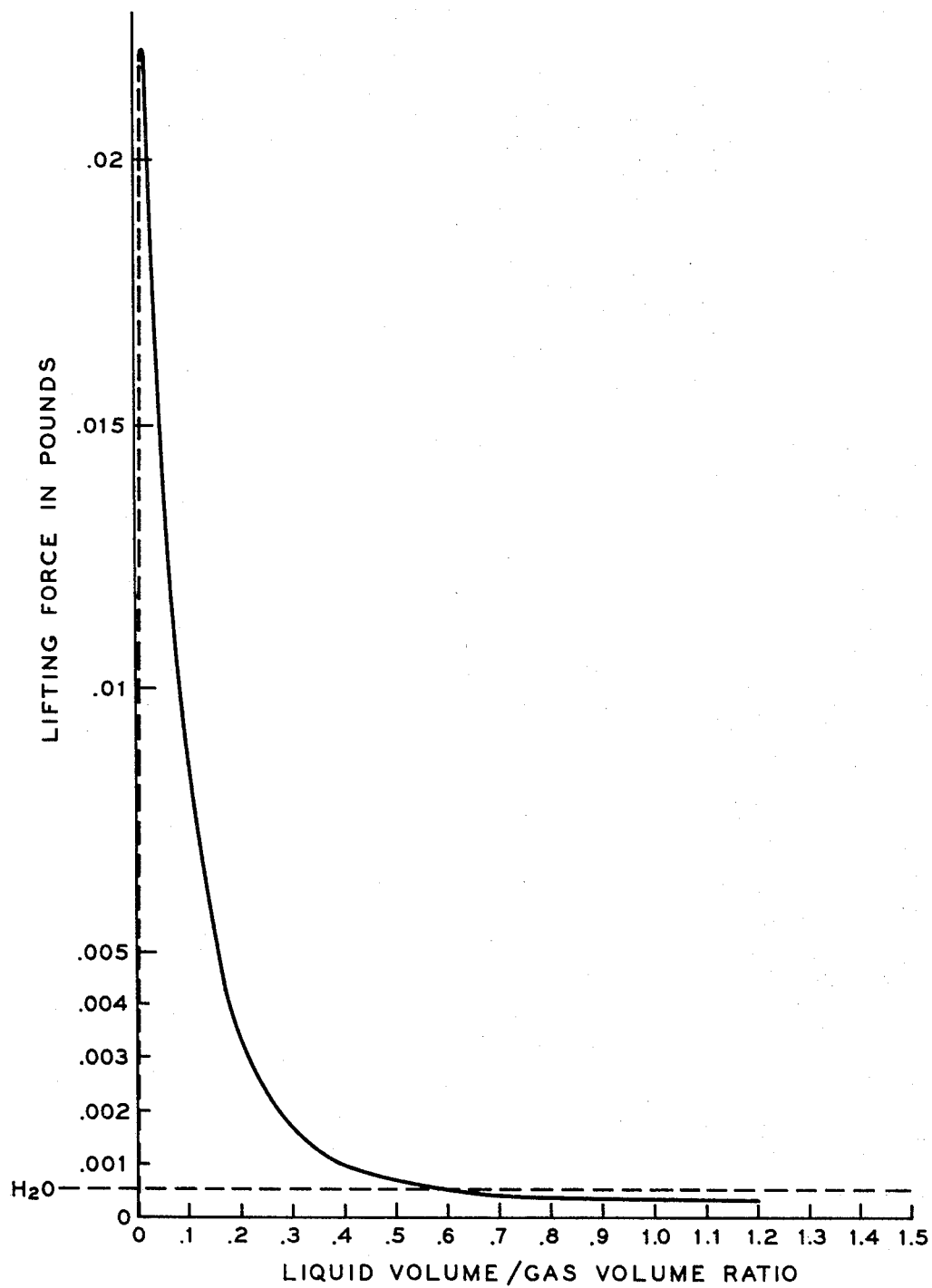
FIG. 2 is a curve illustrating lifting force in pounds as related to liquid volume/gas volume ratio of foam.

It has been found that the lifting ability of foams used in well work is dependent on the liquid volume/gas volume ratio of the foam. As shown in FIG. 2, the maximum lifting ability of a foam occurs when the liquid volume/gas volume ratio is 0.02. As this ratio the lifting ability of the foam is over 30 times the lifting ability of water. The lifting ability of the foam drops off rapidly as the liquid volume/gas volume ratio increases. At a ratio of 0.2, the lifting ability of the foam is approximately six times that of water. This, of course, is a substantial improvement over water. It is thus evident that the liquid volume/gas volume ratio of a foam should be maintained at a value between 0.02 and 0.2 to obtain the benefit of greatly increased lifting capability in such foam.

The data in FIG. 2 was obtained by observing the force exerted by flowing foam of various liquid/gas volume ratios on steel and lead spheres. The foam was a 0.5 percent water solution of a secondary alcohol ether sulfate mixed with air in a foam generator. The foam then was directed into one end of a curved plastic tube containing the sphere and the travel of the sphere in the tube was a measure of the lifting capability of the injected foam. The diameter of the tube was always more than two times the diameter of a sphere and the velocity of the foam travel in the tube was varied between ½ to 1½ feet per second.

It is evident that the liquid volume/gas volume ratio depends on the pressure since gas is a compressible fluid. Thus the volume ratio will depend upon the operational pressure at which the foam is being used in a well. This pressure may be determined by numerous methods. For example, a pressure probe may be located in the well to determine the pressure at one or more points in the well where it is desired to maximize the lifting capability of the foam. In this regard, it is noted that the pressure on foam as it moves up a well will decrease and it is within the contemplation of the invention to add additional surfactant solution to such a foam at one or more points in a well to adjust the liquid volume/gas volume ratio if necessary. It is also possible to calculate the pressure in a circulating foam system. With data on the pressure in the foam circulating system a liquid volume/gas volume ratio is selected to maximize the lifting force of the foam at any desired location. Ratios can also be selected to insure that the lifting capability of the foam will remain high, i.e., more than 6 times that of water, during the entire period circulation in a well.

The liquid volume/gas volume ratio is dependent on pressure. Most oil field flowing meters are calibrated to convert gas flow to standard cubic feet. The liquid volume/gas volume ratio then can be determined for any pressure P (p.s.i.a.) by straightforward calculation. Thus if SCF/G = SCF of gas per gallon of liquid and L/G = the ratio of liquid volume to gas volume at pressure P (p.s.i.a.) then $$L/G = \frac{1}{SCF/G \times \frac{14.7}{P} \times 7.48} = \frac{P}{110\ SCF/G}.$$

Figure 3:
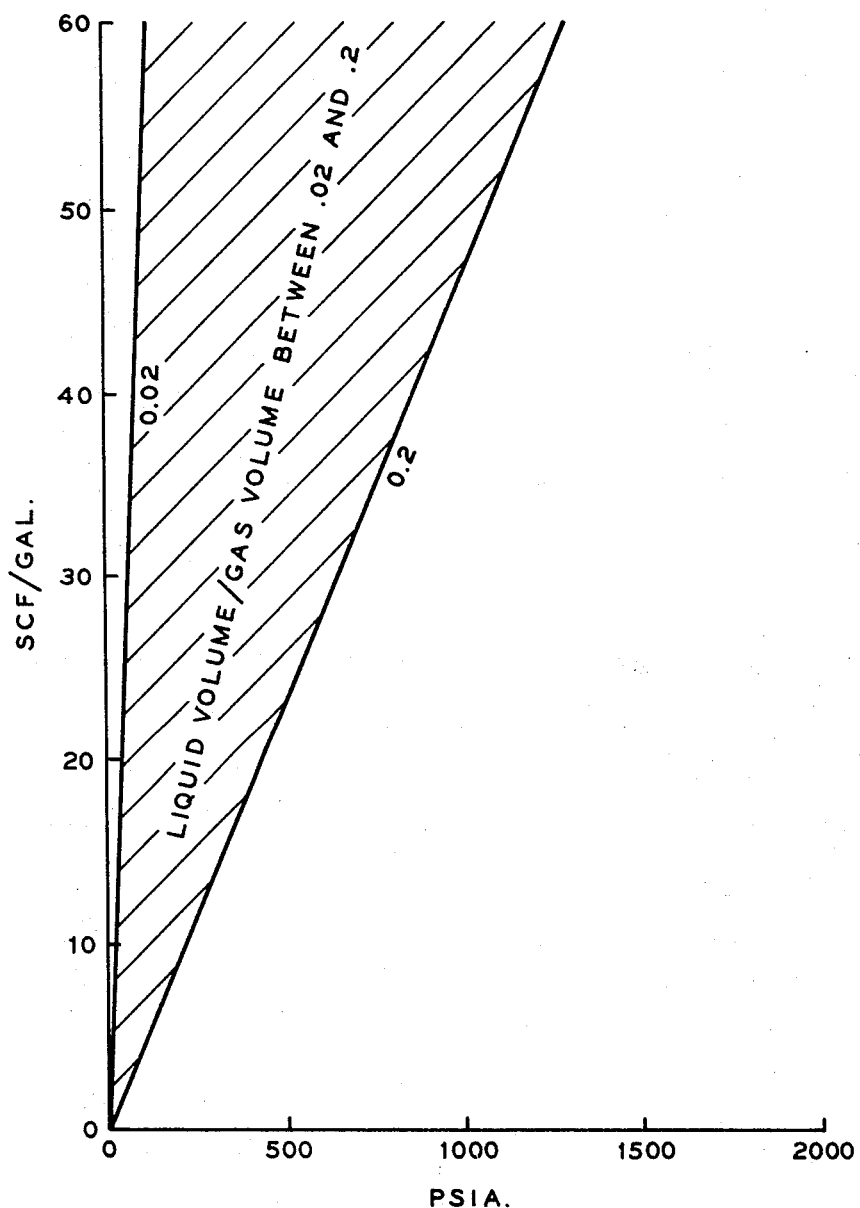
FIG. 3 shows curves bounding an area illustrating the standard cubic feet of gas per gallon of foamable solution which will result in providing a foam having a liquid volume/gas volume ratio at a given pressure of between 0.02 and 0.2.

In FIG. 3 the area between the .02 curve and the 0.2 curve indicates the standard cubic feet per gallon mixture which will give the desired ratio at various conditions of downhole or system pressure. Thus, for example, with an operational system pressure of 500 p.s.i.a., it will require more than 23 standard cubic feet of gas for 1 gallon of foamable solution to maintain a liquid volume/gas volume at less than 0.2 to insure a high lifting capability foam. The flow of gas and liquid to give such a ratio is maintained by controlling the gas and liquid injection rates at the earth's surface.

While preferred embodiments of the invention have been shown and described, it is evident that modifications thereof can be made by one skilled in the art without departing from the scope of the invention

I claim:

1. The method of moving material in a well utilizing a foam injected down said well and circulated up said well comprising the steps of generating a gas/liquid foam, injecting said foam down a well, circulating said foam up the well while maintaining the ratio of liquid volume to gas volume of the foam at a value between 0.02 to 0.2.

2. The method of claim 1 where in liquid is an aqueous surfactant solution and the gas is selected form the group comprising air, nitrogen, natural gas and carbon dioxide.

3. A method of improving the lifting force of foam in a well comprising generating an aqueous liquid/air foam and maintaining the liquid volume/air volume ratio of said foam between 0.02 and 0.2 while circulating such foam in at least a portion of a well.

4. A method of improving the lifting capability of a foam in a well comprising determining the pressure in a portion of a well in which foam is to be injected and adjusting the liquid volume/gas volume ratio of said foam so that the foam has a liquid volume/gas volume ratio between 0.02 and 0.2 in said portion of said well.

PO-1050
(5/69)

UNITED STATES PATENT OFFICE
CERTIFICATE OF CORRECTION

Patent No. 3,583,483            Dated June 8, 1971

Inventor(s) ROBERT W. FOOTE

It is certified that error appears in the above-identified patent and that said Letters Patent are hereby corrected as shown below:

Column 1, line 46, "are contact" should read "are contacted";

Column 2, line 40, "lower head of" should read "lower end of";

Column 2, line 62, "the wall" should read "the well";

Column 3, line 33, "as this" should read "at this";

Column 4, line 12, "period circulation" should read "period of circulation";

Column 4, line 27 "it will" should read "it would";

Claim 1, last line, "0.02 to 0.2" should read "0.02 and 0.2"; and

Claim 2, 1st line, "wherein liquid" should read "where the liquid".

Signed and sealed this 11th day of January 1972.

(SEAL)
Attest:

EDWARD M. FLETCHER, JR.        ROBERT GOTTSCHALK
Attesting Officer               Acting Commissioner of Patents